Inventors:
Robert S. Black &
James S. Carroll,

Inventors:
Robert S. Black &
James S. Carroll,

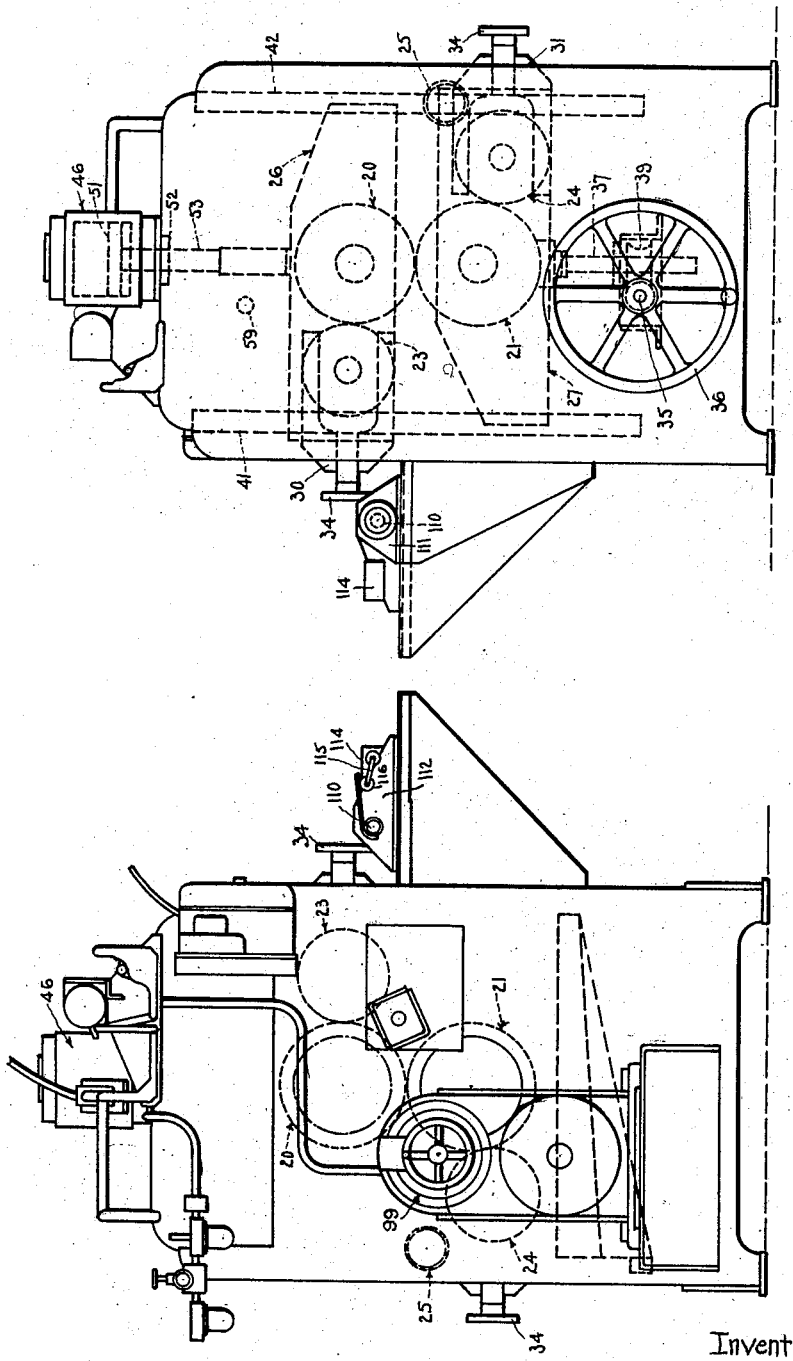

Inventors:
Robert S. Black
James S. Carroll,

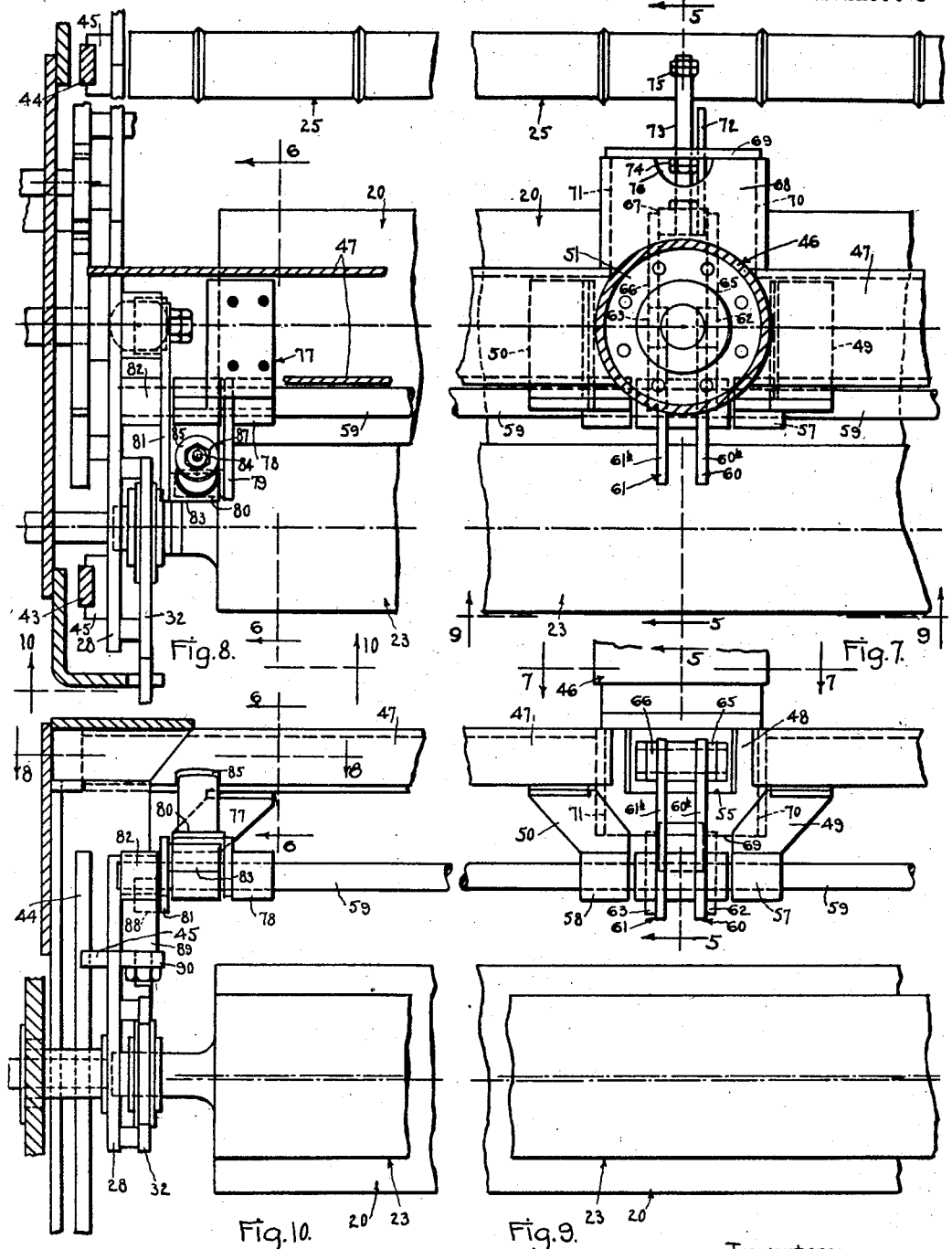

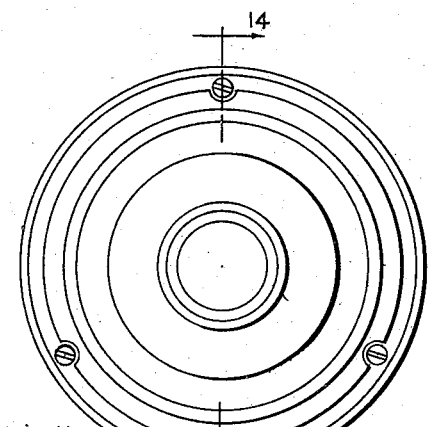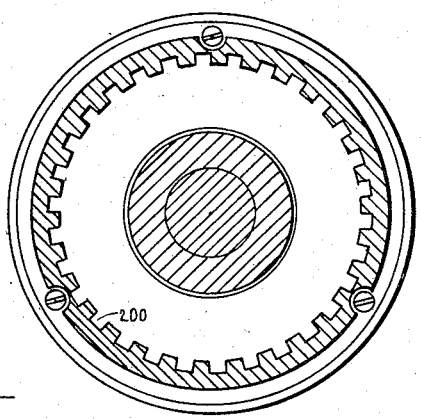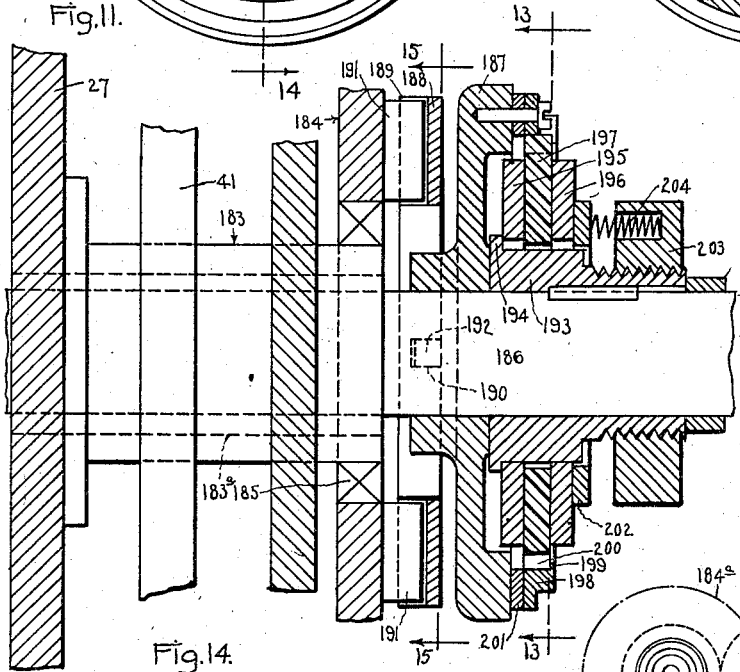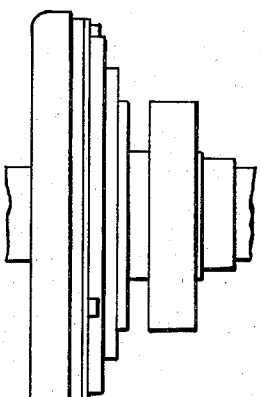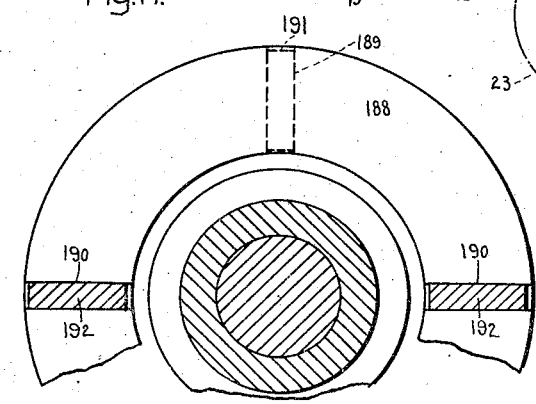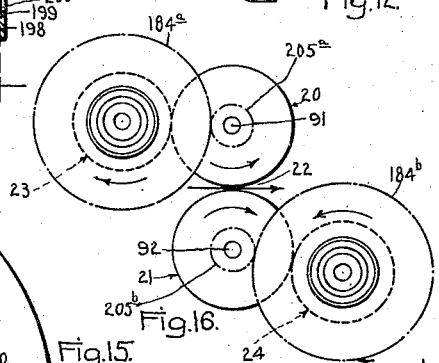
Inventors:
Robert S. Black &
James S. Carroll April 14, 1959   R. S. BLACK ET AL   2,881,731
ROLL TYPE GLUE SPREADERS, SURFACE COATERS, AND THE LIKE
Filed Aug. 8, 1956   7 Sheets-Sheet 7
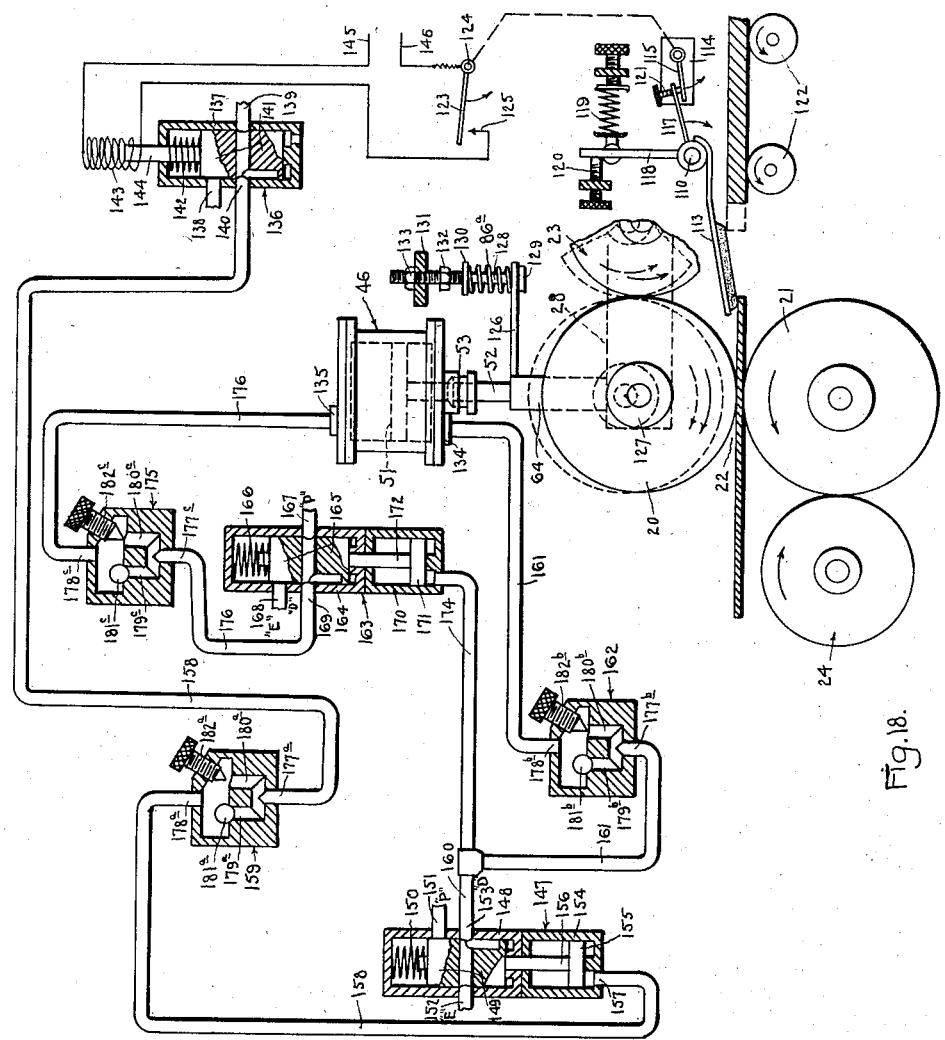
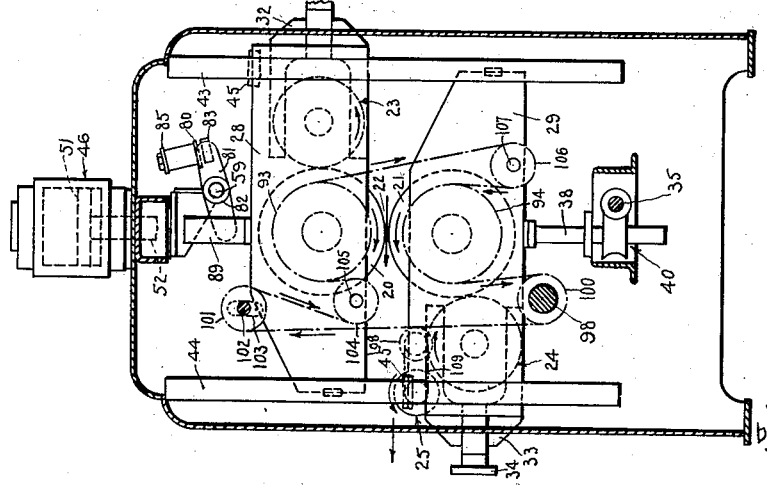
Inventors:
Robert S. Black &
James S. Carroll,

2,881,731
ROLL TYPE GLUE SPREADERS, SURFACE COATERS, AND THE LIKE

Robert S. Black and James S. Carroll, Mendota, Ill.

Application August 8, 1956, Serial No. 602,882

19 Claims. (Cl. 118—1)

Preamble

This invention relates to that general type of glue spreader, or surface coater, disclosed in Letters Patent of the United States No. 2,326,429, issued August 10, 1943, on the application of John E. Black and Robert S. Black, but as will hereinafter appear, certain features of novelty herein disclosed are not limited in their application to devices of the general type of that earlier patent and are of more general application. However, for purposes of clarity of disclosure and understanding of functioning, we will sometimes hereinafter make reference to that earlier patent. In so doing, however, we do not intend to limit the protection to be afforded by the present application and the letters patent to be issued thereon, except as we may do so in the claims to follow.

Generally speaking the presently disclosed device includes two "main rolls" which are journalled one above the other in a common vertical plane and with their respective axes extending horizontally, together with means to apply to the surfaces of such rolls the desired adhesive in liquid form. When both surfaces of a sheet are to be coated such adhesive is applied by maintaining both of the rolls coated with the adhesive; when only one surface of the sheet is to be coated only one of the rolls is maintained coated with the adhesive, generally the upper roll. The sheet is passed horizontally between the two rolls, for which purpose such rolls are set to a clearance between them proper to pass the thickness of the material then being treated. Usually a resilient device is provided in the roll supporting assembly to permit one of the rolls to shift slightly away from the other under resilient force, to take care of slight inequalities in sheet thickness and for other purposes; but the roll supporting assembly also includes means to enable the operator to accurately predetermine and maintain the normal separation between the rolls at that value which will properly receive and treat the thickness of a sheet or sheets being treated. Such general types of device are disclosed in that earlier patent, and are also included in the devices herein disclosed.

In order to accurately control and predetermine the amount of adhesive which will be carried by the roll surface or surfaces to the surfaces of the material being treated there is provided a "doctor roll" for each main roll. Each such doctor roll is journalled parallel to its main roll and is driven at a speed which will be hereinafter discussed while the main roll is rotating. Means are provided under control of the operator for accurately adjusting the separation between each main roll and its doctor roll so that the thickness of the film of adhesive carried by the main roll to the surface being coated may be accurately controlled at all times. The main and doctor rolls are so located in the machine that surface travel of the main roll towards the sheet surface to be coated is from the above separation between the main and doctor rolls so that once the doctor roll has determined the thickness of the adhesive being carried by the main roll's surface, that thickness will be unimpaired by any intervening unit until such main roll surface comes into engagement with the surface of the sheet being coated. Thus there is assurance that the desired thickness of adhesive will actually be delivered to the surface being coated. The means to effect these results is adjustable to a fraction of a thousandth of an inch.

Means to effect the above described functions and results are disclosed in the aforesaid earlier patent as well as in the present application. The following further functions and results of operation which are obtainable in devices embodying the present novel features are now stated:

In a normal run of sheets of stock to be coated all such sheets may be of closely controlled and uniform thickness. Accordingly, a setting of the separation between the rolls to enable proper functioning for such single sheet thickness will take care of operations in which only a single sheet is passed between the rolls at each operation. It sometimes occurs, however, that two sheets in facial contact with each other may be delivered between the rolls at the same time, comprising a double thickness arrival at the main coating rolls. In such an operation it is evident that the resilient roll support previously referred would have to yield sufficiently to accommodate such abnormal sheet thickness (double stock); otherwise serious damage would be produced on the roll surfaces, particularly the surface of the main or coating roll. Even so, the yield thus forcibly produced against the resilient support would of necessity produce a great increase of roll pressures against the sheet surfaces and the adhesive carrying surfaces of the rolls themselves. Improper application of adhesive would then occur so that the desired uniformity of adhesive application to ths surfaces being treated would not occur.

Adjusting the rolls to accommodate either of two thicknesses of sheet units

It is an important feature of the present invention to make provision for automatically setting the separation between the main rolls to the correct value for coating treatment of sheet unit thicknesses greater than that of a single sheet of normal thickness arriving at the rolls, so that as each sheet or set of more than one sheet arrives at such coating treatment location such main rolls will automatically assume that separation between them proper to treat their exposed surfaces, or one such exposed surface with adhesive application under predetermined and correct pressure of the rolls. In connection with the foregoing it is a further object of the invention to provide a novel resilient force transmitting unit for delivering to the rolls a constant force, and a force of the same value, when the rolls are set for either one or more of the thicknesses of stock for which the device is intended. In this connection it is well known that the force needed to effect displacement or distortion of a body under application of applied force increases directly as the amount of such displacement or strain, so that the resisting force must then increase as the displacement is increased. With such an arrangement it is evident that a greater roll pressure would be produced when the increased separation between the rolls was effected merely by forcing such rolls into such greater separation by acting against such resilient means. The present disclosures include a resilient element which acts between two elements of the roll carrying unit so that as such roll carrying unit is itself adjusted for larger or smaller separation between the two rolls, such resilient element nevertheless maintains its original position with respect to the roll to whose journals it is connected. Thus the pressure which will be exerted (being an adjusted amount) between the rolls and the exposed surfaces of the sheet or sheets passing between such rolls will be the same when the rolls are set for passage of a thick sheet or for two or more sheets together as when set for passage of a thin sheet or a single sheet, within the capacity of the device.

In connection with the above stated objective of means to accommodate units of sheets of more than one thickness or sets of more than one sheet at a time, the present disclosures are also such that the separation between the main rolls will be automatically adjusted from time to time as each sheet or set of sheets approaches the coating location, and regardless of the sequence of arrival of the units of the varying thicknesses. As each unit approaches the point of entry between the main rolls a sensor contacts the approaching unit, determines its thickness category, and proceeds to signal to a roll setting device which then sets the roll to that position which will assure the correct separation between the main rolls to correctly accommodate such thickness of the approaching unit. Now it is evident that a time lapse must occur between the sensing operation and the completion of the roll setting operation. It is also evident that for any stated lineal speed of treating operation (being lineal speed of the rolls as well as lineal speed of the approaching and travelling units of sheets), there will be an interval between the time the trailing edge of a now treated sheet unit leaves the rolls and the time when the next sheet unit comes to the rolls for treatment. With the units delivered to the rolls in close succession such spacing interval delay will be small—with a greater distance between proximate sheet unit edges such spacing interval delay will be comparatively large. In any case, however, the automatic sensing and roll shifting devices should be such that the sensing signal will not be translated into roll re-setting prior to the instant that the retreating sheet unit has cleared the rolls, and yet should be such that the roll re-setting operation will be completed prior to entry of the leading edge of the arriving sheet unit at the roll position. Otherwise damage may be done to the rolls and to the leading edge of the entering sheet unit in case such sheet unit is thicker than the preceding one; or in case such following sheet unit is thinner than its precedessor a portion of such following sheet unit may not be properly treated, or the smooth and continuous advance of the units through the coating zone will be interrupted in case the rolls are too far separated from each other to properly meet the needs of the now thinner unit.

We have provided arrangements which include a time-delay element in the signal transmitting and translating devices, so that a pre-determined time-delay will occur between the instant the approaching unit's leading edge reaches the sensing element and the instant of commencement of roll separation re-setting or re-adjustment. That time-delay amount or value is adjustable between two values, for example, one and five seconds, by a manually operated element convenient to the operator. When set to a given delay value such device will function with such pre-set delay for all subsequent operations until such device is again and purposely re-set to some other delay value by the operator.

*Sensing the thickness of each arriving sheet unit*

A simple and satisfactory sensing and re-setting arrangement is one by which the rolls are normally shifted to a position of separation corresponding to units of a known thickness, but will be and are shifted to a larger separation only when a unit of expected greater thickness approaches the treating position. Then such greater amount of roll separation will continue until such unit of increased thickness has passed the treating location, when the separation between the rolls will be again reduced to that amount proper for the thinner units. The specific embodiment herein illustrated and which will be described in detail is one which includes the foregoing operations. However, we wish it to be understood that by so illustrating and describing such specific embodiment we do not intend to limit the protection afforded by the present application and the letters patent to be issued therefrom, except as we may do so in the claims to follow.

*Time delay in re-setting the separation between the main rolls*

In this embodiment the thickness sensor normally occupies a position permitted by units of the thinner value, and the roll separation is correspondingly normally retained at that amount proper for such thinner units. Accordingly, as long as the thin units continue to arrive at the sensing location the roll re-setting devices remain idle with the rolls at their setting for such thinner units. When, however, a thicker sheet unit arrives with its leading edge at the sensing location the signal is transmitted to the roll re-setting elements but through the time-delay element, so that after the pre-determined time delay the rolls will be re-set to the proper separation for such thicker unit. Thereafter the sensing element will continue to send its signal until the trailing edge of such thicker unit passes the sensing element, whereupon such sensing element will signal to the roll re-setting elements to re-set the rolls to their smaller clearance position (for the thinner units), but only after the time-delay as pre-determined by the operator's time-delay setting. If, following such thicker unit there should come another thick unit the sensing element would again signal to re-set the rolls to the greater separation position to accommodate such successive thick unit.

It thus appears that the specific embodiment hereinafter illustrated and to be described is one in which the rolls normally occupy the closer together position for treatment of the thinner units, and that the greater amount of separation is produced only when a thicker unit is sensed in its approach to the treating position.

*Positive stops for limiting setting movements of rolls to both positions of adjusted roll separation*

More specifically the herein illustrated and described embodiment includes a pneumatic cylinder and piston arrangement to effect shift of the upper main roll between a normal lowered position which may be stop adjusted to provide the exact clearance between the main rolls for operation with units of normal thickness, and a shifted to raised position which may be stop adjusted to provide the greater clearance between the main rolls for operation with units of predetermined greater thickness. The shift of the piston to either its lowered stopped position or its raised stopped position is followed by continued application of air pressure against either the upper or the lower face of the piston as the case may be until the next shaft is to occur. Any movement of the upper roll from its so-lowered stopped position, due for example to a slightly oversize unit travelling between the rolls, may occur by exerting an upward force against such upper roll greater than the downward force produced by the air pressure acting against the piston and through the necessary linkage. Thus such a slight increase of clearance between the rolls due to such special condition is a movement away from the lower position stop and against the air-pressure, and thus such slight increase of clearance needed to meet such abnormal condition is taken care of automatically by acting against compressed air and not against a definitely fixed stop of unyielding nature.

*Resilient element in combination with means to adjust separation between the rolls*

On the contrary, when the upper roll has been raised by air pressure to its higher than normal position to accommodate the units of greater thickness further upward movement of such upper roll is positively prevented by the upward limit stop against which the roll is then being retained by air pressure. Accordingly, any oversize unit (oversize compared to the greater thickness for which the upper roll had been set), would tend to force the upper roll still higher; but such further raising of such roll would be positively prevented by the upper stop against which engagement had been produced by the air pressure. Accordingly, in the absence of some resilient element capable of yielding slightly to allow further roll movement upward a severe strain would be developed between the rolls, and other structural parts, besides which the unit then being treated would be subjected to a severely greater compression at the time and area of such unit when such oversize area was encountered. The resilient element previously referred to herein is located in the train of force transmission at a point between the upper roll and the upper stop. Accordingly, when the upward force so developed against the upper roll by such abnormal condition exceeds the pre-loading to which such resilient element shall have been set such element may yield at such pre-load value (which may be anything greater than the desired compression to be developed against the face of the unit being treated) permitting the upper roll to separate slightly farther from the lower roll, and thus accommodating such abnormal condition. After passage of such abnormal thickness unit portion the upper roll will be again restored to its intended position by such pre-loaded resilient element. Such normal position is itself a stopped position to and against which such pre-loaded spring returns the unit when the resisting force falls below the value of the pre-loading.

From the foregoing it is evident that the resilient element herein disclosed for permitting slight yield of the roll to meet emergencies performs two important functions; it permits emergency yield of the upper roll even when the upper position stop would forbid such yield, and it is of such construction, as will presently appear, that it develops a resisting force against the upper roll, which force is the same for small clearances between the rolls, as for large clearances.

Both of the stops for upper roll movement limit are accurately adjustable by screw or nut arrangements, and both are located for convenient manipulation by the operator and without need of removing or displacing other elements.

General

It is next to be observed that the adjustment of the doctor roll which serves the upper main roll and assures exactly the desired rate of delivery of adhesive by the roll's surface to the proximate surface of the sheet unit being coated, must not be affected adversely by the successive up and down movements of the upper main roll to which reference has been made in the foregoing explanation. Any such adverse effect of such main roll's and doctor roll's relative positions would seriously affect the accuracy of delivery of the adhesive to the stock at either or both of the roll's adjusted positions. In the aforesaid Letters Patent No. 2,326,429 there is shown a construction of surface coater embodying at each end of the machine upper and lower "bracket plates." The upper main roll and its doctor roll are journalled with respect to such upper bracket plates, and the lower main roll and its doctor roll are journaled with respect to such lower bracket plates. Such earlier machine's bracket plates are vertically movable with respect to the main frame of the machine. Such vertical movements of the lower bracket plates are to permit adjustment of the clearance between the two main rolls for accommodation of various thicknesses of stock being coated; such vertical adjustments of the upper bracket plates are to permit the upper main roll to rise slightly to accommodate irregularities in the stock's thickness, such upward movements being against spring pressure, and the down movements being limited by suitable stops.

In the hereinafter to be described embodiment of our present invention we have made provision for vertical shifts of the upper bracket plates between lower and upper limits as required to produce the desired changes of clearance between the upper and lower rolls to which we have already made reference. We have also disclosed such arrangements in connection with the vertical adjustability of the lower bracket plates by which the value of the small clearance for thinner sheet units may be adjusted. Thus we have, in the present application made a further contribution to the art of coating and the like as embodied in units of that general type disclosed in said earlier patent.

Slip clutch drive from each main roll to its doctor roll

Reference has already been made to the doctor rolls which are companion to their respective main rolls. As already explained, and as disclosed in that earlier patent, each doctor roll is accurately adjustable, even to the fraction of a thousandth of an inch by means of a micrometer adjustment element. By such means the thickness of the clearance between each main roll and its doctor roll is adjustable, and to a known value. Thus, during normal running of the main rolls the doctor rolls would remain idle during main roll rotation. It is however desirable to cause rotation of each doctor roll as its main roll rotates, such doctor roll rotation, properly controlled, serving well to ensure accurate control of the thickness of the film of adhesive carried by the main roll beyond the doctor roll location, so that a known and uniformly controlled thickness of the adhesive is delivered to the surface of the stock being coated. To ensure such rotation of the doctor roll by drive from the main roll shaft or from a common drive element which drives both the main roll and the doctor roll there is shown in said earlier patent a three pawl and single ratchet wheel device by which the doctor roll is permitted to rotate at speed greater than the drive speed at which it is driven when the two rolls are separated from each other. Normally the driven surface speed of the main roll is much greater than the surface speed of the doctor roll when drive is effected through such pawl and ratchet arrangement, but when, through inadvertence or otherwise the doctor roll may be brought into direct surface contact with the main roll so that the surface speed of the doctor roll is temporarily raised to that of the main roll, the doctor roll is allowed, by reason of the presence of such pawl and ratchet arrangement in its normal drive, to rotate faster than it would be driven by the normal drive arrangement. Thereafter, when the rolls are separated so that such surface contact drive ceases, the pawl and ratchet drive will "take hold" and effect doctor roll drive at its lower and normal speed.

In such earlier patent there is also disclosed a modified arrangement for the doctor roll drive in which modified drive arrangement there is included a friction plate drive between the driving element (drive from the main roll shaft) and the driven element (drive to the doctor roll). That friction drive arrangement includes a central driving plate formed of "brake band material." The companion driven plates are of other material. Experience has shown that much importance must be given to selection of materials for such "over-running" drive connection, when used, since, when contact is inadvertently established directly between the surfaces of the two rolls very quick response in the speed of the doctor roll must occur, allowing it to almost immediately increase its speed to that surface speed of the main roll then existing. The friction of such over-running drive element must be overcome during the increasing of speed of the doctor roll at such times. A further feature of our present invention consists in the discovery of the fact that a central or driving plate (in such an over-runing drive connection) formed of fibre, together with companion driven plates engaging the opposite faces of such fibre driving plate which companion driven plates are of steel, provided with ground engaging surfaces, provides a greatly improved unit for effecting the drive between the main and doctor rolls or their common drive connection.

Delivery roll

In that earlier patent there is disclosed a series of teeth or fingers for supporting the sheet stock at one side of the machine, generally the in-feed side, so as to direct the sheet stock accurately to the clearance between the rolls. No means is, however, disclosed for guiding the delivered sheets as they leave the rolls. It is a further feature and object of the present invention to provide a sheet supporting roll at the delivery side of the main rolls and in position to receive the sheets and support them as they come from between such rolls. Such delivery roll is therefore journalled at elevation correct to provide such a rolling support for the delivered sheets. Preferably also such delivery roll is provided with a series of narrow, knife-like encircling ridges onto which the sheet is delivered and by which the sheet is then supported, such narrow knife-like edges presenting very narrow, almost line-like supporting edges so that the still un-hardened adhesive will not be materially or noticeably disturbed by such ridges.

Since such delivery roll must retain correct elevation at all times with respect to the clearance between the main rolls and with respect to the elevation of the lower main roll, even when such lower roll is raised or lowered to adjust the vertical dimension of the clearance between the rolls, we have herein disclosed a construction in which such delivery roll is journalled in the two lower brackets so that it always retains correct elevational relation to such lower main roll.

We have also provided drive means between the main roll driving elements and such delivery roll, so proportioned and arranged that such delivery roll is driven at the same peripheral speed as the main rolls. Thus, as the coated sheets are delivered from between the main rolls they are received onto supporting elements travelling at their speed, and in proper alignment with the plane at which the sheets are being delivered.

Chain drive for the rolls

To effect drive of both of the main rolls and the delivery roll from a common power source such as a motor actuating through a variable speed gear reduction, preferably of the infinite ratio type, we have in the present application disclosed a chain type of drive, the chain whereof acts against sprockets carried by the shafts of both of the main rolls, and also through suitable transmitting elements to the delivery roll. An adjustable idler sprocket is also provided for adjusting the slack in such chain to ensure best running conditions. Now it is noted that since both such original drive element, such as the motor or the infinite ratio gear reduction element, and the slack adjusting idler are preferably carried by stationary parts of the frame, whereas both of the main rolls and their shafts and sprockets and the bracket plates by which such parts are carried vertically adjustable from time to time, it is desirable to provide a chain drive circuit of such nature that the chain will always remain in that degree of tautness to which it was adjusted by the slack adjusting element, notwithstanding such changes in elevations of the bracket plates from time to time. We have herein disclosed and illustrated and will describe such arrangements.

Other objects and uses of the invention will appear from a detailed description of the same, which consists in the features of construction and combinations of parts hereinafter described and claimed.

In the drawings:

Figure 3 shows a left-hand or drive end view corresponding to Figures 1 and 2;

Figure 4 shows a right-hand end view corresponding to Figures 1, 2 and 3;

Figure 1:
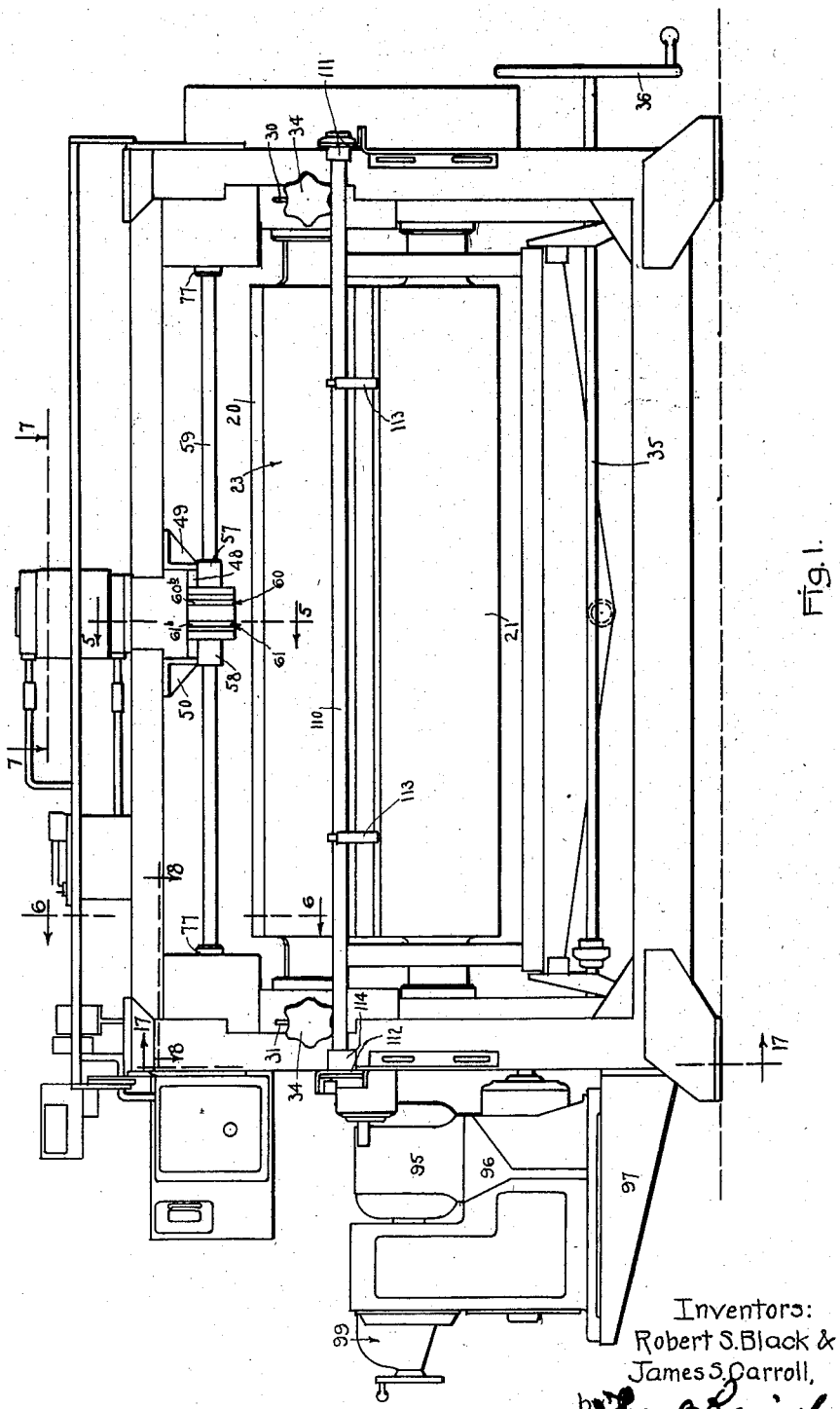
Figure 1 shows a front elevational view of a machine embodying the features of our present invention.
Figure 2:
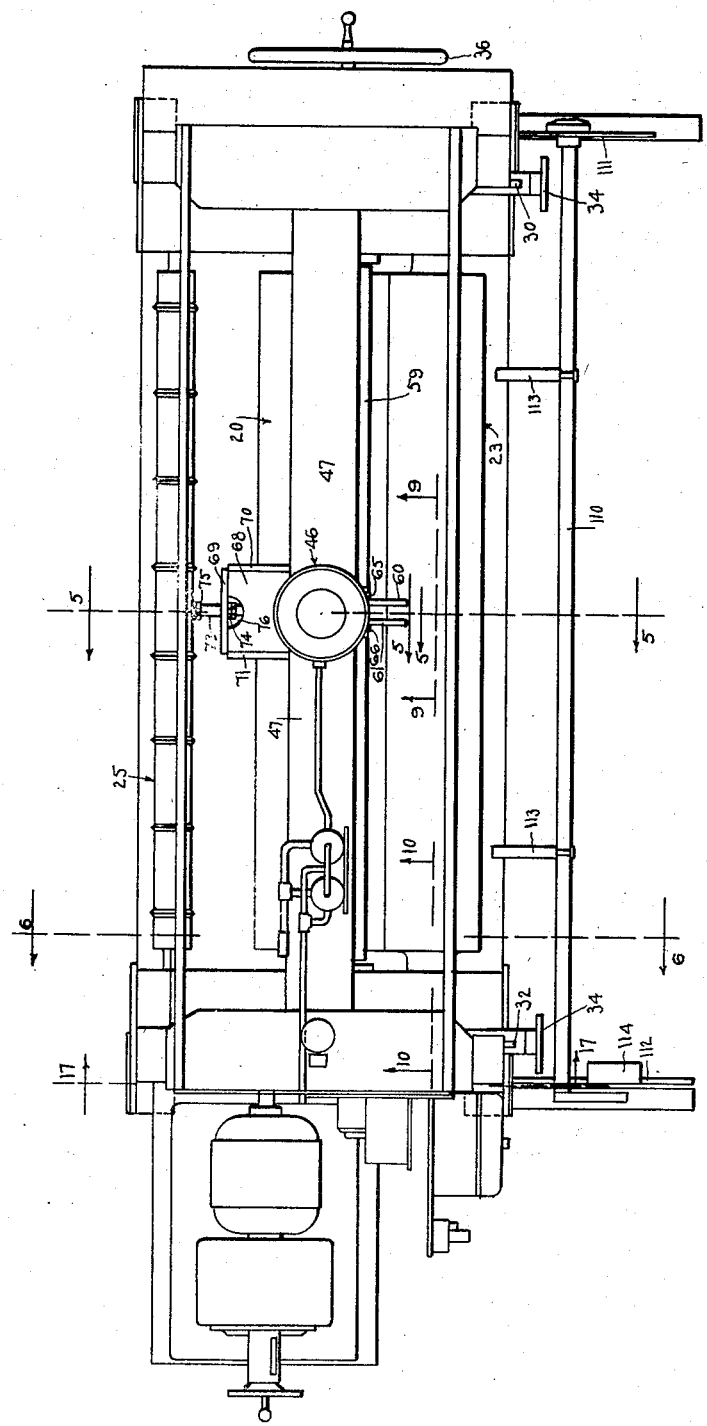
Figure 2 shows a top plan view corresponding to Figure 1.
Figure 6:
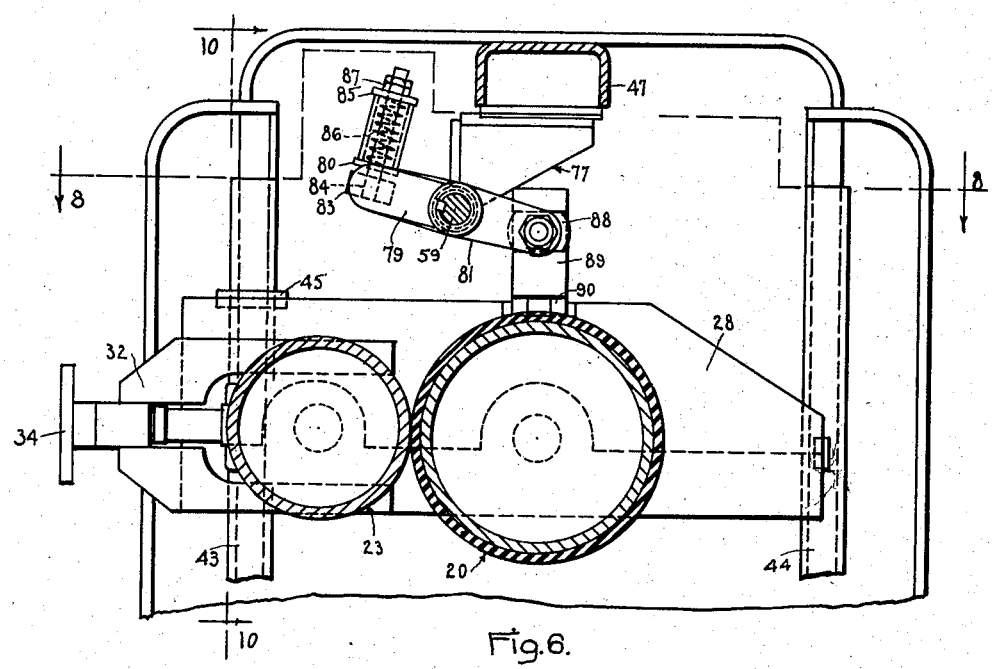
Figure 5:
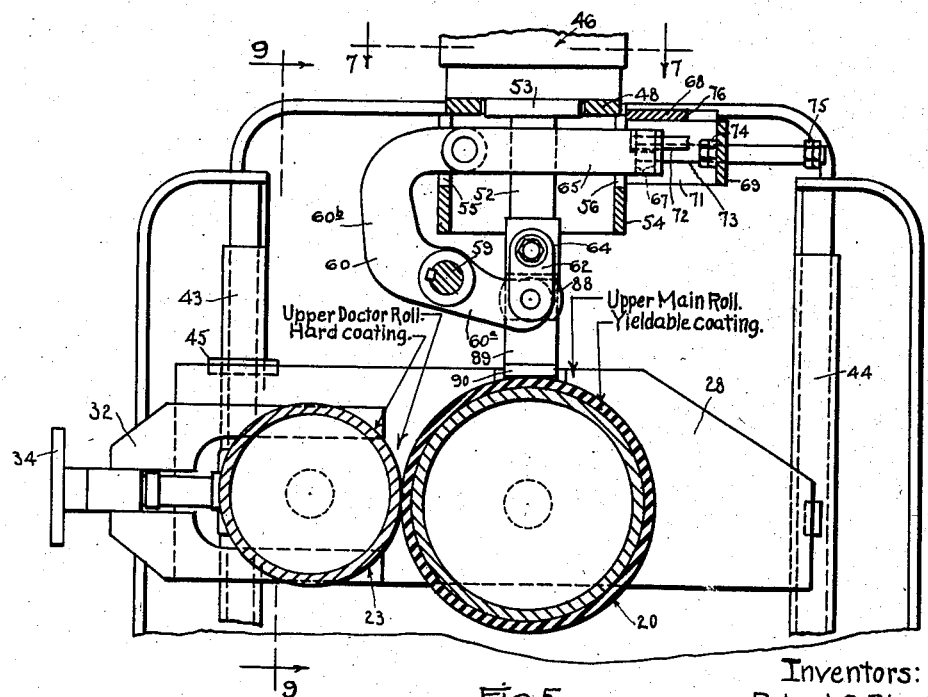

Figure 5 shows, on enlarged scale as compared to Figures 1 and 2, and as compared to Figures 7 and 9, on the same scale as said figures, a fragmentary section, taken on the lines 5—5 of said figures;

Figure 6 shows, on enlarged scale as compared to Figures 1 and 2, and as compared to Figures 8 and 10 on the same scale as said figures, a fragmentary section, taken on the lines 6—6 of said figures;

Figure 7 shows, on enlarged scale as compared to Figure 1, and as compared to Figures 5 and 9 on the same scale as said figures, a fragmentary section taken on the lines 7—7 of said figures;

Figure 8 shows, on enlarged scale as compared to Figure 1, and as compared to Figures 6 and 10 on the same scale as said figures, a fragmentary section taken on the lines 8—8 of said figures;

Figure 9 shows on the same scale as Figures 5 and 7, a fragmentary section taken on the lines 9—9 of said figures;

Figure 10 shows on the same scale as compared to Figures 6 and 8, a fragmentary section taken on the lines 10—10 of said figures;

Figure 11 shows a face view of one of the friction drive elements for driving the doctor roll from the corresponding main roll;

Figure 12 shows a side elevation corresponding to Figure 11;

Figure 13 shows a cross-section taken on the line 13—13 of Figure 14, looking in the direction of the arrows but on reduced scale as compared to said Figure 14;

Figure 14 shows a longitudinal section through the friction drive element of Figures 11 and 12, taken on the line 14—14 of Figure 11, but on enlarged scale as compared to said figures;

Figure 15 shows a cross-section taken on the line 15—15 of Figure 14, looking in the direction of the arrows;

Figure 16 shows, in fragmentary form, and more or less schematically, a view of the gearing for driving the doctor rolls from their corresponding main rolls, through the medium of the friction drive elements;

Figure 17 shows a cross-section taken on the lines 17—17 of Figures 1 and 2, looking in the directions of the arrows; and this figure shows more or less schematically, the chain drive lacing for transmitting drive from the power unit (the motor) to the main roll drive shafts and to the delivery roll, together with the idler sprockets which are carried by the upper and lower bracket elements at the drive end of the machine; and Figure 18 shows schematically, the layout for sensing the thickness of the arriving sheet unit of stock to be coated, the power air cylinder for effecting up and down shifts of the upper brackets according to the sensed thickness of the stock, the time-delay elements, and related parts.

General statement of construction and operation

In the drawings, and referring first to Figures 1, 2, 3 and 4, the upper and lower main rolls are shown at 20 and 21, respectively. In Figure 17 they are shown as being separated a slight distance at 22 to accommodate the thickness of stock for which they have been adjusted. As shown in Figures 3 and 4 these main rolls are located in vertical alignment. The doctor rolls for the upper and lower main rolls are shown at 23 and 24, respectively, it being here noted that the upper doctor roll is located directly in advance of its main roll but that the lower doctor roll is located at a somewhat lower elevation than its main roll and behind such main roll. Such lower elevation of this doctor roll is for the purpose of accommodating the delivery roll, presently to be described and with ample clearance between such delivery and doctor rolls to ensure against improper transfer of adhesive between such rolls during normal operations. The delivery roll is designated as 25 in various figures.

As shown in Figure 4 among other figures, there are provided the upper and lower bracket plates 26 and 27, respectively, at the right-hand end of the device. Similar bracket plates are also provided at the left-hand end of the device as shown in Figure 17, being there designated as 28 and 29, respectively. Of these latter the upper bracket plate 28 also appears in Figures 5, 6, 8 and 10 which will be referred to presently. The main rolls are journalled directly to the upper bracket plates 26 and 28 (for the main roll 20) and 27 and 29 (for the main roll 21). Doctor roll plates 30, 31, 32 and 33 are horizontally adjustably carried by the several bracket plates already referred to, such doctor roll plates being forked as shown in several of the figures to provide horizontally extending spaces within which are accommodated the journals for the doctor roll shafts, so that said journals and thus the doctor rolls themselves may be shifted horizontally with respect to their companion main rolls. Such shiftings are produced by use of the micrometer hand grip wheels 34 shown in various of the figures. By such horizontal shiftings the doctor rolls may be accurately adjusted at desired spacings from their respective main rolls, to thus accurately control the thickness of the film of adhesive which will be carried by the main rolls to the areas of application to the surfaces being treated.

It is here noted that since each doctor roll is journalled to the same bracket plates which carry its companion main roll it follows that variations in elevation of each main roll, presently to be discussed in detail, are accompanied by like variations in elevations of the doctor rolls, so that at all times each doctor retains its proper relation to its companion main roll.

Means are provided for shifting the elevations of the upper bracket plates for various purposes, as will presently appear. Means are also provided for shifting the elevations of the lower bracket plates to adjust the clearance between the lower and upper main rolls according to the normally operative thickness of the stock being treated. Such means is shown as including the horizontally extending shaft 35 which is suitably journalled in the end portions of the frame, and is provided with the hand wheel 36 by means of which it can be rotated to effect the desired elevational adjustments of the lower bracket plates. Such means includes a vertical threaded shaft journalled at each end of the device, such shafts being designated as 37 and 38 for the right-hand and left-hand ends of the device, respectively. These vertical shafts appear in Figures 4 and 17, respectively. Worm and screw connections are established between the shaft 35 and both of the vertical shafts 37 and 38. These are shown at 39 and 40 for the right-hand end and the left-hand end of the device, respectively. These worms are internally threaded to match the shaft threads, and the worms are retained against down movement by suitable thrust bearing arrangements. The shafts have their upper ends connected to the bracket plates and such shafts do not rotate. Accordingly, as the worms are rotated by rotation of the shaft 35 both of the shafts 37 and 38 are raised or permitted to lower by equal amounts thus correspondingly raising or lowering the bracket plates. By this means the entire lower main and doctor roll assembly is raised or lowered while retaining the horizontal condition of the main and doctor roll shafts and without disturbing the clearances between the main and doctor rolls of such assembly. It is also here noted that the delivery roll, 25, presently to be described, is likewise raised and lowered with such lower main roll so that the proper elevational relation between such lower main roll and such delivery roll is maintained at all times.

The aforesaid earlier patent discloses structures such as just described, and such structures are herein illustrated and described in order that the novel features presently to be disclosed may be shown in their relationship thereto and combinations therewith.

At this point it is noted that suitable guides are provided at each end of the device to ensure guided movements of all of the bracket plates during their vertical adjustments. Such guides are shown at 41 and 42, for the right-hand end of the device, and at 43 and 44, for the left-hand end of the device. The bracket plates are provided with suitable elements, such as the U-shaped blocks 45 which ride on these guides during the vertical movements and retain the bracket plates against horizontal displacements. These blocks 45 are shown in various figures.

In the earlier patent there is disclosed means to limit the downward movement of the upper bracket plates, together with adjustable yieldable means, to exert downward pressures on the upper main roll and hold it at such limited downward movement position for the purposes already explained. In the present machine, wherein the clearance between the upper and lower main rolls is to be adjustable to at least either of two values to accommodate at least two thicknesses of units of sheet stock being coated, such earlier form of yieldable means and related parts has been discarded and other means substituted in place thereof as will presently appear.

*Raising and lowering the upper main and doctor rolls to accommodate units of stock of different thicknesses in succession*

We shall now describe the means herein disclosed for effecting vertical shifts of the upper main and doctor rolls between the two pre-determined limits of shifts or positions of such rolls, and shall then describe the means to automatically effect such shifts by activation of such shifting means, according to the sensed thicknesses of the oncoming units of sheets of stock. It is understood that during these shifts the elevation of the lower main and doctor rolls is not changed, these remaining at the elevation prescribed by the adjustments effected by the hand wheel 36 and already described. Thus the lower shifted position of the upper main and doctor rolls determines the clearance between the upper and lower main rolls for such adjusted elevation of the lower main roll, and thus determines the thickness of stock units to be accommodated normally during the operation of the machine. For accommodation of the thicker stock the upper main and doctor rolls are raised by the means now to be described.

A vertical pneumatic cylinder 46 is secured to the longitudinally extending frame element 47 of the machine. These parts are shown in various of the figures. Such supporting is conveniently effected by use of a special form of bracket 48 having the oppositely disposed upwardly extending arms 49 and 50 which are connected to the proximate end portions of the frame element 47, which frame element is severed in its central portion to accommodate such special bracket element 48. The bracket 48 is so formed as to provide an open space extending vertically from the lower end of the cylinder to a location lower than the frame element 47 so that proper connection may be made directly from the piston 51 which works within the cylinder and operative elements located below the cylinder. The piston rod 52 extends from such piston through a suitable stuffing box 53 shown at Figures 5 and 18 in particular. Thus compressed air or other gas such as inert gas of which $CO_2$ is an example, may be used to effect piston movements in both directions, and to exert pressures in either direction as ordered by the sensing and related apparatus. Conveniently a cylindrical shell 54 extends down from the lower end of the cylinder and between the proximate ends of the severed frame member 47 and constitutes a portion of the means to connect the cylinder to such frame member. Such shell 54 when used is provided with oppositely disposed openings 55 and 56 through which horizontally movable link elements operate, such link elements constituting portions of the means to limit the vertical movements of the upper bracket plates to which the upper main and doctor rolls are journalled. Various of the elements just above referred to are well shown in Figures 5, 6, 7 and 9, as well as other figures.

The bracket elements 49 and 50 already referred to provide central journal supports for the journals 57 and 58 in which a longitudinally extending shaft 59 is journalled centrally of its length. Its right-hand and left-hand end portions are journalled at locations close to the upper bracket plates as will presently appear. The bell-cranks 60 and 61 of like form are located at the opposite sides of the downwardly projected axis of the piston rod. These bell-cranks are set onto and secured to the shaft 59 so that oscillations of the bell-cranks must be accompanied by like shaft oscillations. Each such bell-crank includes the rearwardly extending substantially horizontal arm $60^a$ or $61^a$ as the case may be, and with the vertically extending arm $60^b$ or $61^b$ as the case may be. The horizontal arms $60^a$ and $61^a$ reach rearwardly to positions at opposite sides of the piston rod as shown in Figure 5 (see also Figure 9); and the rear ends are pin connected to the short links 62 and 63 (63 not appearing in Figure 5 as it is located directly in line with 62); and the upper ends of such links are pin connected to a sleeve 64 secured to the lower portion of the piston rod. Accordingly, up and down movements of the piston and piston rod must be accompanied by corresponding oscillations of the bell-cranks, and since such bell-cranks are secured to the shaft 59 such shaft is also correspondingly rocked between angular limits of oscillation as will presently appear.

*Pre-setting the upper rolls for minimum and maximum thicknesses of sheet units to be coated*

Reference to Figures 5, 7 and 9 shows that a horizontally extending link is provided for each of the bell-cranks. These are the links 65 and 66. They have their forward ends pin connected to the upper ends of the vertical bell-crank arms $60^b$ and $61^b$, and extend horizontally through the openings 55 and 56 of the shell 54, already referred to. The rear ends of the links 65 and 66 are connected to a block 67 so that such block must move back and forth according to the bell-crank rockings. A plate 68 is secured to the shell 54 and extends rearwardly in horizontal plane to a location beyond the extreme rearward movement of the block 67 (and links 65 and 66). A flange 69 extends down from the rear end of this plate 68, and side plates 70 and 71 also extend down from such plate 68 to reinforce the same and lend stiffness thereto. A guide rod 72 has its front end secured to the block 67 and extends through the flange 69 so that downward movement of the links 65 and 66 and the block 67 is prevented, and said parts are compelled to travel back and forth horizontally as the piston and piston rod are reciprocated up and down in the cylinder 46.

Another rod 73 is secured to the block 67 and projects rearwardly therefrom as well shown in Figures 5 and 7. This rod also extends through the flange 69 with freedom of movement. Limit nuts 74 and 75 are threaded onto such rod 73 at opposite sides of the flange 69 so that such nuts serve to limit rod movements in both directions. Conveniently lock nuts are assembled onto the rod against such stop nuts to ensure against improper shift of the stop nuts from their purposely adjusted positions.

It will now be seen that the extent of oscillation of the shaft 59 may be determined by the adjustments of such stop nuts to various positions, and also that the absolute locations of such stoppages may be adjusted by stop nut adjustments. Thus even when full air or gas pressure is continuously exerted against one face of the piston or the other face, the extent of piston movement and oscillation of the shaft 59 will be limited according to the pre-settings of such stop nuts. It will also be noted that downward piston movement (produced by admission of compressed air or gas against the top face of the piston) produces rearward movement of the rod 73 and thus tends to retain the stop nut 74 in limited position against the inside face of the flange 69. However, it will also be noted that an upwardly acting force exerted against the piston of amount great enough to overcome the down thrust exerted by the air or gas pressure will act to force the piston upwardly. As will presently appear the up force exerted against the upper main roll tends to also force the piston upwardly, so that the arrangement is such that in case of an obstruction of abnormal thickness coming between the rolls so that up movement of the upper roll should be required such up movement may be produced when the pressure rises to that value which will overcome the down thrust then being exerted by the air or gas pressure acting against the piston. Thus, although the normal downward movement of the upper roll is limited or stopped at the position dictated by the setting of the stop nut 74 the device is still capable of yielding upwardly to relieve an emergency condition, and without need of provision of any special yieldable element in the train of forces as far as such a condition is concerned.

On the contrary, when air or gas force is admitted against the bottom face of the piston the rod 73 will be drawn forwardly until limited by the stop nut 75. Such movement will raise the upper main roll to provide an increased clearance for passage of stock of greater thickness between the main rolls. Having effected such rise of the upper main roll no further increase of the clearance between the rolls can be produced without the interposition of some form of yieldable element in the train of force transmission since no further movement of the rod 73, the bellcranks, the shaft 59, and the piston can occur in such direction, once the stop nut 75 has moved over into engagement with the flange 69. We shall presently disclose such a yieldable element in the train of force transmission which element is peculiarly adapted to meet the requirements of the present problem.

Conveniently an opening 76 may be provided in the plate 68 to give access to the stop nut 74 for adjustment purposes, it being noted that the other stop nut 75 is freely accessible for adjustments thereof.

*Provision for emergency temporary increase of separation between the main rolls for condition of adjustment of said rolls for either minimum or maximum thickness of sheet unit to be coated*

The shaft 59 is carried close to the ends of the device and operative connections are established from such ends to the proximate bracket plates 26 and 28 which journal the upper main and doctor rolls as already explained. Since the operative connections from the two ends of the shaft to the proximate bracket plates are identical except formed in reverse viewing we shall describe only one set of these connections, being that at the left-hand end of the machine and close to the drive elements. Reference is now had to Figures 5, 6, 7, 8, 9 and 10 in particular, as follows:

The left-hand end of the shaft 59 is supported by a bracket 77 secured to the frame element 47, such shaft support being a journal. The form of this bracket is shown in Figure 6. The shaft journal proper is shown at 78 in Figures 8 and 10. Secured to the shaft at the right-hand side of such journal (when looking towards the in-feed side of the machine) is a crank lever 79 which projects forwardly on a more or less horizontal plane. The free end of such crank lever carries a leftwardly extending plate 80, conveniently welded to the crank lever. Another crank lever 81 is journalled on the shaft just to the left of the bearing 78 by the bearing 82, and this crank lever extends rearwardly so that connections may be established to both its forward and rearward end portions. At its forward end this crank lever 81 carries a plate 83 below the plate 80 which is connected to the crank lever 79. A rod 84 has its lower end secured or connected to the lower plate 83 and extends freely through the upper plate 80. The upper portion of this rod receives a top plate 85 with freedom of movement along the rod so that the location of such plate 85 may be readily adjusted. A compression spring 86 is interposed between such top plate 85 and the plate 80 connected to the crank lever 79, and adjustment nuts 87 are threaded onto the top end portion of the rod 84 and press against or limit the upward movement of the plate 85. By adjustment of these nuts the spring may be placed under pre-compression loading, it being noted that when the parts are in their relaxed condition the proximate faces of the plates 80 and 83 are in contact. (In Figure 6 a slight clearance is shown between these plates, corresponding to exertion of a transmitted force greater than the amount of pre-loading just referred to.)

It is now evident that whenever a resistance to down movement of the rear end of the crank lever 81 occurs a corresponding force must be transmitted through the pre-loaded spring. As long as such resistance is not too great the force to be transmitted through the spring will not exceed its preloading and it will remain fully extended—that is, the plate 80 will remain in contact with the plate 83, or vice versa. When, however, the resistant force becomes greater than the amount which can be transmitted through such pre-loading the spring will be correspondingly forced to shorten, the plate 83 moving down away from the plate 80, and drawing the rod 84 with such plate 83, and thus further loading the spring until a new balance of conditions and forces is attained. It is then noted that as such excessive force is reduced the spring will again distend, carrying the plate 85 and rod 84 and plate 83 up, thus rocking the crank lever 81 on the shaft (such shaft remaining unrocked) until the plate 83 again comes into engagement with the plate 80. Thereupon both crank levers will rock in unison, the shaft also rocking or being rocked from another location.

The rear end of the crank lever 81 is pivoted to a block 88 (see Figure 6) which is seated into a recess formed in the right-hand face of a block 89 whose lower end is secured to a rightwardly projecting flange 90 secured in turn to the upper edge portion of the upper bracket plate 28 (at the left-hand end of the machine). (See Figures 6, 8 and 10.) Accordingly the up and down movements of the upper bracket plate and the upper main and doctor rolls, and the rockings of the shaft 59 are normally harmonized; and such harmony exists as long as the resistive force encountered by the upper main roll does not exceed the pre-loading to which the spring 86 has been set. A greater resistive force will then result in further movement of the main roll and upper bracket plate, without corresponding shaft movement, and with further spring compression.

It is now noted that the nature and relation of the forces exerted through the spring unit are such that the rod 84 tends to assume a position normal to the lever arms of the two crank levers 79 and 81. Therefore the transmission of the forces through this unit is effected with a minimum of developed force at all points, and the slight compressions which the spring must suffer from time to time under emergency conditions are controlled to the best advantage. Also, placement of the spring adjusting nuts 87 at the upper end of this unit ensures a maximum of convenience in making spring adjustments from time to time.

*Driving means for both main rolls with provisions for avoidance of slack in drive chain for all conditions of amount of separation between the main rolls*

We next consider the means which we have provided for drive of the two main rolls, and their doctor rolls, and the relation of such drive to the various arrangements already discussed. For this purpose reference is invited to Figure 17 in particular, as follows:

The main roll shafts 91 and 92, for the upper and lower rolls, respectively, extend leftwardly beyond the bracket plates 28 and 29, and are provided with sprockets 93 and 94. The driving primary unit shown comprises a motor 95 (see Figures 1, 2 and 3), carried by a bracket 96 on a suitable pedestal 97 secured to the left-hand frame member of the machine. This motor acts through a variable speed ratio unit, preferably of the infinite ratio type such as a Reeves unit, and delivers the desired speed and available torque to the shaft 98, the variable ratio unit being shown at 99. The shaft 98 is journalled in the end frame member and reaches to the right-hand side thereof where it carries the sprocket 100. This sprocket is located below the lower bracket element 29 and on a fixed axis.

A chain slack adjusting sprocket 101 is journalled on the shaft 102 which is vertically adjustable in a vertical slotted opening 103. This slack adjustment sprocket is located above the upper bracket plate 28. Such upper bracket plate 28 has journalled thereto an idler sprocket 104 on the stud 105, which stud is secured to the lower portion of the upper bracket plate and alongside of the lower portion of the sprocket 93 on the shaft of the upper main roll. The lower bracket plate 29 has journalled thereto an idler sprocket 106 on the stud 107, which stud is secured to the lower portion of the lower bracket plate and alongside of the lower portion of the sprocket 94 on the shaft of the lower main roll. The chain lacing is indicated in Figure 17 and the direction of chain travel through its principal tangents is shown by means of the arrows. The following comments are now in order respecting this arrangement:

Since both of the bracket plates are vertically adjustable (this also being true at the opposite or right-hand end of the structure), and since the drive unit does not change elevation during the vertical adjustments of the rolls, provision must be made in the chain lacing so that the total tangent length travel of the chain through its circuit is always the same irrespective of the vertical adjustment of the bracket plates at any given time. Study of the chain lacing shown in Figure 17 will reveal that this result has been attained by the arrangements therein shown. This result is made possible because of the location of the idler sprockets 104 and 106 on studs carried by the upper and lower bracket plates, respectively, the drive shaft 98 and the slack adjustment idler 101 being mounted to stationary elements, one below and the other above the remaining elements of the chain train. It will be seen that vertical movement of the upper bracket plate will cause increase of tangent length at one side of the sprocket 93 and corresponding and equal decrease of tangent length at the opposite side of such sprocket. Likewise, vertical movement of the lower bracket plate will cause increase of tangent length at one side of the sprocket 94 and corresponding and equal decrease of tangent length at the opposite side of such sprockets. Thus it is not necessary to re-adjust the slack take-up idler according to changes in elevations of the bracket plates. In the case of the present machine, wherein changes of elevation of the upper bracket plates will be automatically produced and may be of rather frequent occurrence this feature of non-requirement for change in the position of the idler is very important.

A further important function and objective is obtained by reason of the provision of the chain lacing as above explained in combination with the changes in elevation of the upper bracket plates and the upper main and doctor rolls. This relation is as follows:

Examination of the directions of chain travels on the tangents shown in Figure 17 reveals that the chain tensions at both sides of each of the main roll sprockets 93 and 94 are downward, so that double downward forces equal in amount to the chain tensions are produced against each of such sprockets. Such downward forces are additive to the compressive force being exerted against the lower main roll by the sheet being coated. However, such downward forces in the case of that lower main roll are directly transmitted to the adjustment shafts 37 and 38 already referred to, and do not disturb other operating elements of the device. However, in the case of the upper main roll wherein the holding of that roll in either its lowered stop position or its raised stop position must be considered, the effects of such down pull on the sprocket 93 should be considered in their relation to the compressive force which may be delivered to the sheet being coated. The following analysis is therefore in order:

When the upper main roll is in its lowered stop position air pressure is being exerted against the top face of the piston urging such roll downward, and such downward movement is limited by the stop nuts 74 as already explained. Under these conditions the additive downward force exerted by the chain travelling over the sprocket 93 merely serves to increase the force exerted against such stop nuts and does not affect the elevation of the roll unless there should come some form of exceptional and unyielding area of the sheet being coated so that up yield would be necessary. In such case the added downward force of the chain tangents would increase the force needed to effect such temporary rise of the roll. But in no case would the roll be caused to move to a level lower than that permitted by the setting of the stop nuts 74. On the contrary, when the roll is in its raised stop position air pressure is being exerted against the lower face of the piston urging upward roll movement, and such upward movement is then limited by the setting of the stop nuts 75 as already explained. The downward pull then being exerted by the chain tangents extending down from the sprocket 93 tends to decrease the force which may be exerted against the surface of the sheet being coated; and since such downward pull effect produced by the chain tangents acts directly against the roll's shaft, and not through the spring unit (spring 86) it follows that a direct effect is produced on the compressive force which will be exerted against the surface of the sheet then being coated. This effect will be an increase in the amount of the compressive force needed to cause rise of the upper main roll under emergency conditions, for a certain setting of the spring pre-load of the spring unit. Generally the spring unit may be set at a somewhat lower pre-loading compression than would otherwise be required for such unit, approximating that amount of such downward pull so developed by the pulls exerted by the chain tangents.

*The delivery roll and provision for drive thereof*

The delivery roll 25 is journalled in the lower bracket plates 27 and 29. This roll is shown in Figure 17, among others. A simple form of drive for this roll is also shown in that figure. This includes a sprocket 108 journalled in the bracket plate 29 and at position such that its teeth mesh with the proximate tangent of the chain. This sprocket 108 then drives the delivery roll in convenient manner, as by a chain drive 109 including sprockets on the delivery roll and on or connected to the sprocket shaft of the sprocket 108. By this means the delivery roll is driven in proper direction to receive the delivered sheets and carry them away from the main roll position. The gear ratio of such drive should be such that the peripheral speed of such delivery roll is the same as the sheet delivery speed. Since this delivery roll is journalled to the lower bracket plates it retains its proper elevation with respect to the lower main roll regardless of variations in the elevation of that roll by adjustments of the hand wheel 36.

*The sensing and signalling means for controlling separation of the main rolls for either of two specifications of thickness of the sheet units*

It remains to disclose the sensing means embodiment and the signal translating means herein disclosed to effect proper operations of the shifting means whereby the upper main roll and its doctor roll are shifted up and down according to the sensed thicknesses of sheet units arriving at the coating location. Reference is made particularly to Figure 18 in this connection, but we wish it understood that we do not intend to limit the protection to be afforded by this application and the letters patent to be issued thereon to such sensing and operating equipment, except as we may limit ourselves thereto in the claims to follow.

A suitable source of compressed air or other gas or vapor is provided; and for simplicity of illustration we have not shown the same in Figure 18 but we have therein shown the inlet connections for such compressed medium at the locations of various elements of equipment which receive such compressed medium.

Extending across the front portion of the machine there is the rock shaft 110 journalled in the brackets 111 and 112 supported by the end frame elements of the machine. This rock shaft carries one or more rearwardly extending sensing fingers 113, see Figure 18 and also Figure 3, which latter figure shows the assembly, such fingers normally slanting down from the shaft and formed on their lower faces for easy sliding engagement with the oncoming or leading edge of the sheet unit to be sensed, and to then ride easily on the top face of such unit during passage of the unit to and between the main rolls. The arrangement is such that as each unit comes to the sensing location one or more of such fingers will be engaged by the leading edge of such unit and rock the shaft through a small angle in clockwise direction when viewed as in Figures 3 and 18. The fingers will return the shaft to its normal or counterclockwise moved position when no sheet unit surface is present to effect clockwise shaft oscillation, preparatory to the next sensing operation to be produced by the succeeding unit's arrival. It is thus evident that a fresh sensing operation is produced corresponding to the arrival of each unit at the sensing position.

A suitable switch such as a conventional microswitch 114 is carried by the left-hand bracket 112, such switch being provided with a rearwardly extending arm 115 having a small roller 116 at its rear end. The proximate end of the rock shaft 110 carries a forwardly extending arm 117 which will engage such roller as the shaft is rocked clockwise by engagement of one or more of the sensing fingers with the arriving sheet unit's edge; and the extent of shaft oscillation will then depend on the thickness of such unit. The parts are so proportioned that such shaft oscillation will not be sufficient to actuate the microswitch when the arriving unit is of normal thickness, but whenever such unit is of over-thickness the microswitch will be actuated by the greater amount of shaft oscillation, and thus a signal will be delivered to the actuating devices presently to be described. It is also noted that when the microswitch has been thus actuated it will be held in such actuated condition as long as one or more of the sensing fingers continues to ride on the top surface of the then being coated unit, but as soon as the trailing edge of such unit arrives at the location of the fingers and the last to be engaged finger has been released by such trailing edge, the shaft will move back to its normal position, being a counterclockwise movement when viewed as in Figures 3 and 18. Such return movement will be produced by gravity or by spring means if desired. Such return movement will release the switch arm 115, permitting it to rise under impulse of the spring biased leaf of the microswitch, or by other suitable means. It is understood that such microswitches are themselves provided with spring biased contact leaves which normally retain a position against one of two fixed stops, but when properly actuated such biased leaf will snap from such first contact to another fixed contact, thus changing the circuits as desired. Switches of this general type are well known and widely used in the arts, and we do not deem it necessary to further illustrate or describe the same here.

Referring especially to Figure 18, we have therein shown the arm 118 secured to the rock shaft 110, being supplemental to the showings of Figure 3. A spring 119 urges this arm in direction to restore the rock shaft to its normal or counterclockwise rocked position, at which point its movement is limited by the adjustable stop 120 which stop may be set to various adjusted positions according to the requirements of the operation. We have, in Figure 18 also shown an adjustable pin 121 carried by the arm 117 in position to engage the microswitch arm or finger 115. By adjustment of this pin 121 the device can be set to cause the microswitch to reverse its contacts for various pre-selected thicknesses of sheet, so that the device is made responsive to any selected sheet thickness within the range of adjustments for which provision has been made. We have also, in Figure 18 shown the supporting rollers 122 in position to guide and deliver the sheets to the proper registry with the coating space between the main rollers. These rollers 122 may be driven in convenient manner but in proper speed with respect to the speed of the main rollers.

In Figure 18 we have also shown the microswitch biased spring leaf at 123, but for convenience of illustration such leaf is there shown as being mounted for movement with a shaft 124, shown connected to the arm 115 outside of the microswitch enclosure. This contact normally stands in its raised or open position as shown in the figure, but when the microswitch is reversed by movement of the arm 115 such contact 123 snaps into engagement with the stationary contact 125 and thus establishes the desired circuit control as long as such condition exists.

*The schematic layout of the automatic control and shift of the upper rolls for either minimum or maximum separation between the main rolls*

In Figure 18 we have also shown the pneumatic cylinder 46, the piston 51 therein, and the piston rod 52 extending through the stuffing box 53. For convenience we have there shown the piston rod as being directly connected to the block 64 without the interposition of the rock shaft 59; but we have shown schematically the preloaded spring unit including the spring 86ª, the arm 126 connected to the upper roll journal element 127, the rod 128 freely movable through such arm and having its end enlargement 129 in engagement with the lower face of the arm, the abutment 130 connected to the rod 128 and adjustable thereon for adjustment of spring compression, the stationary abutment 131 through which the rod extends, and the inner and outer adjustable screws 132 and 133 on the rod and adjustable thereon, and located at opposite sides of the stationary abutment 131.

The compressed air connections to the lower and upper ends of the cylinder are shown at 134 and 135, respectively. The upper and lower main rolls are shown at 20 and 21 and their companion doctor rolls are shown at 23 and 24. The upper bracket plate 28 is also shown in connection with the upper main roll and doctor roll journals. Two positions of the upper main and doctor rolls are shown, a full line position corresponding to the lower stopped position, and a dotted line position corresponding to the upper stopped position.

A solenoid operated air valve for primary control is shown at 136. It includes the casing 137 having the pressure air supply connection 138, the exhaust connection 139, and the delivery connection 140. This latter connection 140 controls delivery of compressed air to and release of air from another unit or units presently to be disclosed. Within the casing is reciprocably carried the plug 141 which is normally moved to the position shown by means of the spring 142. A solenoid 143 has its armature 144 connected to the plug 141 in such fashion that energization of the solenoid shifts the plug from its position of Figure 18 to another position, retaining such other position only as long as the solenoid is energized, and when such energization ceases the plug is returned to its normal position (shown in Figure 18) by means of the spring.

The plug 141 is provided with passages or recesses of such form that when it is in its normal position connection is established between the delivery connection 140 and the exhaust connection 139, whereas when the plug is shifted into its solenoid actuated position connection is established between the air supply connection 138 and the delivery connection 140. Normally the air supply connection is sealed as shown in Figure 18, but when the plug is shifted the exhaust connection becomes sealed. The function of this unit 136 is to control the functioning of the actuating units by use of compressed air or other gas, and to effect such controls according to the electrical signals delivered from the microswitch already referred to. For this purpose an electrical supply is shown by the terminals 145 and 146 together with suitable connections between such supply and the microswitch contacts. The arrangement is such that while the microswitch remains in its normal or unsprung biased leaf position for open circuit the solenoid remains un-energized, whereas when the microswitch is reversed the circuit is closed for supply of current to the solenoid, and as long as this condition obtains the valve plug will be drawn to the position for supply of compressed air through the delivery connection 140. When the microswitch again returns to its non-shifted position the valve plug is returned to its spring urged position shown in Figure 18.

This unit 136 may be designated as the Primary Control unit. While it serves to control supply and release of compressed air to a further unit such further unit is not the cylinder 46 but certain intermediate element or elements. Thus the air supplied by this unit 136 is control air and not power air. This unit controls a power air control unit 147 whose functions and construction are as follows:

The unit 147 includes the casing 148 wherein there is reciprocably mounted the plug 149 normally shifted to one end of the casing by the spring 150. The compressed air supply connection 151, the air release connection 152, and the delivery connection 153 are provided in such casing. The plug is provided with passages and recesses such that when the plug is in its normal or spring urged position (shown in Figure 18) the delivery connection is connected to the release connection. When the plug is forced to its other position against the urging of the spring the delivery connection 153 is connected to the air supply connection 151, the release connection being then closed.

A small air cylinder 154 is connected to one end of the casing 148, being provided with the air piston 155 whose piston rod 156 extends into the casing 148 and is connected to or against the plug 149 thereof. Accordingly, when compressed air is supplied through the connection 157 into the cylinder 154 the piston thereof is driven against the spring 150 to reverse the position of the plug 149 and effect the desired change of connections established by the unit 147. The air supply connection 151 of this unit 147 receives its compressed air from any convenient source, but preferably the same source as that supplying the unit 136.

The connection 157 of the cylinder 154 connects by the line 158 to the delivery connection 140 of the unit 136 so that functioning of the unit 147 is controlled by the primary solenoid controlled functioning of the unit 136. We shall presently make reference to a time delay unit 159 which is included in the line 158 for purposes which will then be explained.

The delivery connection 153 from the unit 147 connects by lines 160 and 161 to the connection 134 at the lower end of the power cylinder 46, preferably with inclusion of a time-delay unit 162 presently to be described. It will now be evident that shift of the primary control unit 136 from its normal position, such shift being caused by the sustained signal coming from the microswitch and due to presence of a sheet or unit of the greater thickness at the sensing location, will cause shift of the plug 149 of the unit 147 to position for supply of compressed air to the lower face of the piston 51 of the power cylinder. This will produce raising of the upper bracket plates together with the upper main and doctor rolls, to the stopped position determined by the adjustment of the nuts 75. Such condition will continue only as long as the microswitch is retained in its shifted position, and for a further time-delay interval to be presently explained.

There is provided another unit 163 of construction the same as or similar to that of the unit 147, including the compressed air operating element of such unit. Thus this unit 163 includes the casing 164, the plug 165, the spring 166, the connections 167 and 168, the delivery connection 169, the casing 170, the piston 171 working therein, the piston rod 172, and the controlling air supply connection 173. But examination of the connections 167 and 168 will reveal that by supplying compressed air through the connection 167 of Figure 18 instead of through the connection 168 of such unit, and by using the connection 168 as the release connection instead of the connection 167, a reversal of operations is produced in this unit 163 as compared to the unit 147. Accordingly, by providing a line 174 from the line 160 the plug position of the unit 163 will be reversed when compressed air is being supplied by the unit 147 due to the signalling of the microswitch as already explained, so that such reversal of the position of the plug of such unit 163 will then permit release of air from the top end of the power cylinder, closing the air supply connection 167 of the unit 163. However, under the normal condition of the operation, when sheets or units of the thinner specification are coming to the rolls for treatment, the microswitch will not be in its reversed condition, the unit 136 will be in the plug position shown in Figure 18, the unit 147 will be in the plug position shown in Figure 18, the unit 163 will be in the plug position shown in Figure 18, and compressed air will be delivered to the upper end of the power cylinder and against the top face of its piston 51. Thus, normally the upper bracket plates and the upper main and doctor rolls will be retained in their lowered positions as limited by the adjustment of the stop nuts 74, and the compressive force produced by the upper main roll against the top surface of the sheet will be that determined by the pressure of the gas or vapor in the upper end of the power cylinder.

For convenience in reading the drawing we have provided the legends "P," "E" and "D" at the several connections of the units 136, 147 and 163, these legends indicating Pressure, Exhaust and Delivery, respectively.

A time-delay unit 175 is included in the line 176 which connects the delivery connection 169 of the unit 163 to the upper end of the power cylinder, such time-delay unit serving functions to be presently described.

While we have in Figure 18 shown the forms of the units 136, 147 and 163 schematically, devices responding to the requirements of these units are well known and in wide use at the present time in various of the arts. By way of example only, and not for any purpose of limitation such devices are supplied at the present time by The Ross Operating Valve Co. of Detroit, Michigan, and are illustrated in the catalogue No. 53 of that company as follows: The unit 136 may be supplied by a Ross 730 M.V. Solenoid Direct-Operated 3 W., N.O. valve shown on page 110 of said catalogue, the unit 147 may be supplied by a Ross 732 M.V. In-Line 3 W., N.O. Sequence valve shown on page 114 of said catalogue, and the unit 163 may be supplied by a Ross 732 R.M.V. In-Line 3 W., N.C. valve shown on page 114 of said catalogue. Other constructions and forms of valves may also be used to fulfill the requirements of such units 136, 147 and 163.

*The provision of time delay of shift of the upper and lower rolls after the sensing signal is emitted*

It was previously stated that certain time-delays should be provided in the functioning of various elements in order to assure against improper raising and lowering of the upper rolls prior to the times when such operations should occur. The time-delay units 159, 162 and 175 have been shown schematically in Figure 18 in connection with the provision of such time-delay operations. At this point it is noted that such time-delay elements should so function that prompt responses of the piston movements of the power cylinder will occur when the desired time-delays have expired, as pre-set by the operator; sluggish movements of the power piston to effect raising and lowering of the rolls should be avoided.

Each of the units 159, 162 and 175 includes a casing having therein the opposing connections 177 and 178 between which are located parallel passages 179 and 180. (For purposes of convenience in description and to avoid confusion as between like elements of the three units we have designated like parts of all three units with like numerals, but have included the suffixes "a," "b" and "c" to correspond to the respective units 159, 162 and 175.) A check such as a ball 181 is provided in connection with the passage 179 to positively prevent back flow of air through such passage while allowing fast delivery of air in the forward direction. An adjustable needle valve 182 is provided in connection with the other passage 180, which needle valve may be adjusted for a desired rate of air leakage in reverse direction. With this arrangement flow of air from the connection 177 to the connection 178 is substantially unobstructed, the check valve opening wide to allow such flow, whereas flow of air from the connection 178 to the connection 177 is completely blocked through the passage 179 by the check but flow in such direction may occur at reduced controlled rate by the setting of the needle valve.

Now the illustrated arrangement is one by which the shift of the valve unit 147 from its illustrated position to its reversed position (against spring force) will occur very promptly since the reversal of the solenoid operated valve 136 by a signal coming from the microswitch will act almost at once to deliver air pressure against the lower face of the small piston 155 of such unit 147, it being noted that such flow of air under pressure to such face of such piston is practically unobstructed by the time-delay unit 159. Accordingly fast response in delivering pressure air to the line 153 will occur. Thus fast response in delivery of pressure air to the bottom face of the power piston 51 of the roll actuating cylinder 46 and to the small piston 171 of the unit 163 will occur. This is because almost immediate reversal of the valve unit 163 will occur against the urging of its spring, and almost immediately full air pressure will also be built up against the lower face of the power piston since the time-delay unit 162 will allow free flow of air through the line 161 for that purpose. Now the reversal of the unit 163 will place the line 176 from the top of the power cylinder into connection with the release connection 168ᵉ of such unit 163; but such condition will occur under conditions of reversed flow through the line 176. Thus the check valve 181ᶜ will lock against such reverse air flow, with the result that air flow from the top side of the power piston 51 must be solely through the needle valve 182ᶜ. The setting of that needle valve should be such as to permit full rise of the power piston before the leading edge of the approaching sheet unit reaches the main rolls, so that such rolls will be sufficiently separated to accommodate such sheet unit (if it is of greater thickness than its predecessor) without jamming or other deleterious effects. It is also noted that the slowing down of release of air from the top side of the power cylinder will result in production of an air cushion to prevent undesirable and even dangerous shock at conclusion of the upward travel of such piston.

Study of the operating conditions which will obtain during lowering of the power piston are similar to those just above explained. That is to say, full opening delivery of air under pressure against the top face of the power piston will occur without obstruction from the time-delay unit 175, but release of air from the lower portion of the power cylinder and from beneath the power piston will be checked by the setting of the needle valve of the unit 162.

The foregoing means to effect desired time-delays between the giving of signals by the sensing apparatus and the responses effected at the power cylinder is effective but is herein disclosed as one means to effect such results. Alternatively, electronic or like elements may be used to effect such time delays. One such arrangement includes the slow discharge of a capacitor to a selected voltage at which a suitable electronic tube will respond and suddenly pass a plate current to activate a control solenoid to operate suitable valve means for admission of air pressure to one face of the piston with corresponding release of air from the other face of such piston. Accordingly, we do not intend to limit the time-delay features desired in the present combination to those specifically disclosed herein, except as we may so limit ourselves in the claims to follow.

By way of illustration only, and not as a matter of limitation to any specific form of time-delay valve arrangement reference is made to the Ross type valve designated as 518 M 1 Speed Control Valve, shown on page 116 of the previously mentioned catalogue No. 53 of that company.

*The special slip clutches to effect drive of the doctor rolls*

We have, in the Preamble referred to a specific form of drive arrangement for the doctor rolls, which includes a friction type of clutch and specifically a clutch in which the friction plates include a fibre material driving plate gripped between two polished surface metal plates which are driven by the power input element. Reference to Figures 11 to 15 shows a very satisfactory construction of such device, and Figure 16 shows schematically the arrangement of driving and driven elements at the right-hand end of the device shown in Figures 1, 2, 3, and 4, and elsewhere. Reference is called to these figures as follows:

In Figure 16 the shafts of the two main rolls are shown at 92 and 91. They carry the pinions 205$^b$ and 205$^a$, repectively. The two doctor roll shafts are shown in substantial horizontal alignment with the corresponding main roll shafts, except that the shaft for the doctor roll of the lower main roll is set at slightly lower elevation than its main roll shaft to provide additional clearance for passage of the delivered sheets onto the delivery roll 25. We have shown the larger gears 184$^b$ and 184$^a$ corresponding to the pinions of the main gears, and meshing with such pinions. It is here noted that such doctor gears are considerably larger than the pinions with which they mesh so that, drive coming from the main shaft pinions, the tendency is for the doctor rolls to be driven at much slower speed than the corresponding main rolls. Taking into account the difference in diameters and perimeters or circumferences of the main and doctor rolls, when each doctor roll is separated from its main roll for control of the thickness of the film carried by the main roll to the surface of the sheet being coated, it will be found that, with the gear ratios shown in Figure 16, there is a reduction of about 1/4.2 in the peripheral speed of each doctor roll as compared to its main roll. Other ratios would, of course, obtain when the dimensions and proportions of parts were modified from those illustrated. The result is that during running under the stated conditions each doctor roll is compelled to drag behind its main roll surface speed, so that a holding back effect is produced, the doctor roll constantly tending to hold back the film of adhesive while the main roll surface advances rapidly ahead of the surface of its doctor roll. In the absence of a restraining force of sufficient magnitude the doctor roll would be rotated at substantially the same surface speed as its main roll, even when the doctor roll is slightly separated from its main roll by proper adjustment of the micrometer hand grips 34 for such doctor. Such effect would be produced by the adhesive tendency produced by the film of adhesive in contact with the surfaces of both rolls. But the pinion-gear drive is of sufficient driving force to ensure overcoming such tendency, so that each doctor roll must lag behind its main roll, producing the desired holding back effect on the film of adhesive, and under control of the setting of the doctor roll.

Whenever, through inadvertence or otherwise, a doctor roll moves into contact with its main roll, even for a short time, a direct driving engagement is produced from the main roll to its doctor roll, and due to the above stated ratio of substantially 4.2 as between the slowed down speed of the doctor roll produced by the gear-pinion drive and the direct contact speed produced when the two rolls are brought into direct engagement with each other, a sudden considerable increase in doctor roll surface speed must occur. This necessitates a "running ahead" of the doctor roll as compared to the tooth driven speed of its gear element 184$^b$ or 184$^a$, as the case may be. The clutch drive not to be described enables this result to be obtained without damage to the rubber surface of the main roll when its doctor roll suddenly comes into engagement with production of a large tangential force at the line of contact between the two rolls.

In Figure 14 we have shown in fragment a portion of the bracket plate 27, being the lower right-hand bracket plate and also shown in Figures 4 and 17. A hollow collar 183 is secured to the bracket plate, reaching outwardly endwise of the machine. This collar's through opening 183$^a$ is large enough to permit the maximum lateral shift of the doctor roll shaft to occur under operation of the micrometer hand grips, and still allow freedom of shaft rotation within the collar. Journalled on the outer end of such collar is the gear wheel shown by the numeral 184 in Figure 14, only the central portion of such gear wheel being shown. The shaft extends through and past such gear wheel and the flange 187 is set onto the extending portion of the shaft and is free to rotate thereon. This location of the flange 187 is far enough from the hub portion of the gear wheel to accommodate the ring shaped element 188. This element 188 has two radial slots 189 facing towards the gear element and extending diametrically opposite to each other, and also has two other radial slots 190 facing towards the flange element 187, and extending diametrically opposite to each other and located substantially ninety degrees from such slots 189. Radial tongues 191 extend from the gear element into the slots 189 and other radial tongues 192 extend from the flange element 187 into the slots 190.

Study of the above arrangement will show that it provides a universal joint drive from the gear element to the flange element so that lateral shifts of the doctor roll shaft may be made, carrying the flange element with such shaft during such shifts, but the gear element may remain unshifted and thus may continue drive of its pitch line in engagement with the pitch line of the meshing pinion.

A collar 193 is keyed to the shaft beyond the flange element, and is provided with an outwardly extending flange or rib 194 at its inner end. Two metal plates 195 and 196, preferably of steel, are freely set onto this collar element 193 but are keyed thereto as shown in Figure 14, and are thus drivingly connected to the shaft of the doctor roll which is to be driven by the gear and pinion connection to the main roll. The proximate surfaces of these metal plates are polished and very smooth. Between these metal plates there is located a ring or annulus 197 of fibre having very smooth surfaces which are engaged by the polished surfaces of the metal plates. These plates are all brought together under spring pressure by the ring 202 set against the outer face of the right-hand plate 196 and pressed leftwardly against such plate 196 by springs 204 (only one of three set one hundred twenty degrees apart around the circle is shown). The right-hand ends of these springs are received in the sockets of an adjustment block 203 which is threaded onto the end portion of the sleeve. By adjustment of this block 203 the amount of spring pressure may be exactly adjusted to produce and ensure the correct amount of driving effect without slip when the doctor roll is separated from its main roll, and yet to allow slip to occur promptly when direct engagement of the surfaces of the two rolls does occur. The outer edge of the plate 197 is provided with numerous teeth which are engaged with inwardly facing teeth of a ring element 198 secured to the flange plate 187 so that such plate 197 is drivingly connected to the flange plate 187 and thus also to the gear through the medium of the universal joint already referred to.

Experience has shown that by use of fibre for the intermediate and "driving" plate, instead of brake band material a much improved operation is secured when on occasion a direct engagement of the doctor and main rolls occurs since such fibre material does not have the sticky form of surface which is encountered in the case of brake band materials.

It is emphasized that there is a special and unusual relation between the slip clutch formed of the polished surface metal driven plates in facial adjustable spring pressed engagement with the intermediate smooth surface fibre driving plate in such a coating machine as is herein disclosed in which the fibre driving plate is positively driven with the main roll and in which the metal driven plates are positively drivingly connected to the doctor roll or its shaft, and in which the driving ratio between the main roll and the fibre driving plate is greater than unity by an amount such that sudden and unusual contact between the two rolls necessarily causes a great and sudden increase in the rotational speed of the doctor roll. When such a sudden contact between the roll surfaces occurs the rotary inertia of the doctor roll must be overcome to bring such roll up to rotary speed great enough to bring the surface speed of the doctor roll to equality with the surface speed of the main roll. It is of course impossible to instantly produce such increase in speed of the doctor roll. Consequently there is a time interval during which the slip drive from the fibre plate to the two metal plates must permit the slip to increase from zero slip to a rate of slip needed to accommodate the conditions imposed by the gear ratio of drive and the actual diameters of the main and doctor rolls. During the interval that the doctor roll is in surface driving contact with the main roll slip must occur in the clutch and the rate of that slip must increase from zero to a maximum value as just explained. But until that maximum rate of slip in the clutch occurs there must also be slip between the surfaces of the two rolls. That slip is at a maximum rate at the instant of contact between the roll surfaces and falls to zero when the equality of surface speeds of the two rolls has been attained. During this interval serious damage may be done to the surface of the main roll when such surface is rubber or neoprene or other like yieldable material, and especially when it is provided with fine encircling grooves and ribs. It is important therefore to establish conditions under which the danger of damage to the surface of the main roll shall be reduced to a minimum.

To reduce the danger of damage to the surface of the main roll as much as possible every precaution must be taken to avoid possibility of sticking or "grabbing" of the driving and driven elements of the clutch. It has been found that any such material as brake lining of conventional composition frequently sticks to the companion metal plates of a slip clutch which includes a clutch element formed of such brake lining, together with companion metal plates pressed against such brake lining element. On the contrary we have found from actual use of clutches which include one element formed of fibre and the companion elements formed as smooth or even polished metal plates, that repeated surface engagements of the main and doctor rolls show no indication of any such sticking or grabbing of the clutch plates. Thus the danger of damage to the surface of the main roll is reduced to a minimum.

We claim:

1. In a roll type coating machine the combination with upper and lower cooperative main rolls, one of said rolls being an adjustment roll and movable towards and from the other main roll, journals for the ends of the adjustment roll, supports for said journals movable in direction to shift the adjustment roll towards and from the other main roll, means to guide said supports in their adjustment movements, and means to rotate both rolls for surface travel in the same tangential direction in their proximate surface portions, of means to simultaneously shift both said supports for movement of the adjustment roll towards and from the other main roll for change of the amount of the surface separation between the rolls, said means including a motor, operative connections from the motor to the supports, means to supply motive energy to the motor for actuation of the operative connections for adjustment roll movement either towards or from the other main roll selectively, and means to limit movement of said parts corresponding to adjustment roll position at minimum and maximum amounts of surface separation between the rolls said movement limiting means comprising a stationary abutment, a tension and compression resisting element movable with respect to the abutment and in proximity to said abutment, operative force transmitting connections between the journals for the ends of the adjustment roll and said tension and compression resisting element, and stops between the tension and compression resisting element and the abutment effective to limit movement of said tension and compression resisting element with respect to the abutment, one stop limiting such movement of such tension and compression resisting element in one direction and the other stop limiting the movement of the tension and compression resisting element in the opposite direction, said two limits of movement of the tension and compression resisting element corresponding to said minimum and maximum amounts of surface separation between the rolls.

2. Means as defined in claim 1, wherein the motor is reversible and wherein the adjustment roll movement either towards or from the other main roll is selected by selection of direction of motor operation.

3. Means as defined in claim 1, wherein at least one stop is adjustable to adjust the limit of movement of the tension and compression resisting element in one direction of movement of said element corresponding to one of said amounts of separation between the rolls.

4. Means as defined in claim 1, wherein both of said stops are adjustable to adjust the limits of movement of the tension and compression resisting element in both directions of movement of said element corresponding to both of said amounts of separation between the rolls.

5. Means as defined in claim 1, wherein the force transmitting connections between the journals for the ends of the adjustment roll and the tension and compression resisting element include a force transmitting unit, said force transmitting unit including an elastic element comprising a portion of the force transmitting connections between the journals for the ends of the adjustment roll and the tension and compression resisting element.

6. Means as defined in claim 1, wherein the motor comprises a reversible pressure fluid motor, and wherein motor drive in one direction urges movement of the adjustment roll towards the other main roll and motor drive in the opposite direction urges movement of the adjustment roll away from the other roll, and wherein the first mentioned stop limits movement of the adjustment roll towards the other roll under the urge of said fluid motor, and the second mentioned stop limits movement of the adjustment roll away from the other roll under the urge of said fluid motor.

7. Means as defined in claim 6, wherein the tension and compression resisting element is under compression when a stop limits movement of the adjustment roll towards the other roll under motor urge and wherein said tension and compression resisting element is under tension when the other stop limits movement of the adjustment roll away from the other roll under motor urge.

8. In a roll type coating machine the combination with upper and lower cooperative main rolls, one of said rolls being an adjustment roll and movable towards and from the other main roll, journals for the ends of the adjustment roll, supports for said journals movable in direction to shift the adjustment roll towards and from the other main roll, means to guide said supports in their adjustment movements, and means to rotate both rolls for surface travel in the same tangential direction in their proximate surface portions, of means to simultaneously shift both said supports for movement of the adjustment roll towards and from the other main roll for change of the amount of the surface separation between the rolls, said means including a motor, operative connections from the motor to the supports, means to supply motive energy to the motor for actuation of the operative connections for adjustment roll movement either towards or from the other main roll selectively, and means to limit movement of said parts corresponding to adjustment roll position at minimum and maximum amounts of surface separation between the rolls, together with means to support successive sheet units of material to be coated in position for delivery to the separation space between the main rolls and to deliver the sheet units in succession to said separation space, a sheet unit thickness sensing element, means to support said sensing element in location to sense the thickness of each sheet unit arriving at a location for sheet unit delivery to the space between the main rolls, means in connection with the sensing element to deliver a signal corresponding to the thickness of the sheet unit being sensed, means to control delivery of the motive energy to the motor, means to actuate said motive energy delivering control means for actuation of the motor to produce change of amount of separation between the rolls in at least one kind of such change of separation, and means to transmit the signal from the signal delivering means to the motive energy control actuating means effectively to cause the motor to shift the roll supports for adjustment of the separation between the rolls corresponding to the thickness of the sheet unit so sensed by the sensing element.

9. Means as defined in claim 8, wherein the sensing element includes a sheet unit surface engaging element which is movable between a first position and a second signal delivering position, said first position corresponding to surface engagement with sheet units of not more than a first pre-selected thickness and said second position corresponding to surface engagement with sheet units of more than said first pre-selected thickness, said minimum of surface separation between the rolls corresponding to the thickness of sheet units of the first pre-selected thickness and said maximum amount of surface separation between the rolls corresponding to the thickness of sheet units of the second mentioned pre-selected thickness, and the means to actuate the motive energy delivering control means being constituted to actuate the motor to produce adjustment roll movement away from the other main roll to the maximum amount of surface separation between the rolls.

10. Means as defined in claim 9, wherein the sheet thickness sensing element includes means urging movement of said element to its first defined position when the sheet unit surface engaging element is not in engagement with the surface of a sheet unit of the second pre-selected thickness.

11. Means as defined in claim 8, wherein the operative connections from the motor to the supports for the journals of the adjustable main roll include a yieldable element yieldable between a first non-yielded position and a second yielded position, and stop means to limit the movement of the yieldable element at the first defined non-yielded position.

12. Means as defined in claim 11, wherein said stop means is adjustable.

13. Means as defined in claim 8, wherein the motor is a pneumatic cylinder and a piston and piston rod working therein, and wherein the operative connections from the motor to the supports comprise operative connections from the piston rod to such supports, and wherein the means to supply motive energy to the motor comprises connections and valves for supply of compressed medium to the ends of the pneumatic cylinder.

14. Means as defined in claim 8, wherein the means to control delivery of the motive energy to the motor and the means to actuate said motive energy delivering control means for actuation of the motor to produce change of amount of separation between the rolls for either kind of such change of separation are constituted to deliver the motive energy to the motor continuously while the sensing element remains in its corresponding signal delivering position.

15. Means as defined in claim 14, wherein the motor is a pneumatic cylinder and a piston and piston rod working therein.

16. Means as defined in claim 15, wherein the operative connections from the motor to the supports for the journals of the adjustable main roll include a yieldable element yieldable between a first non-yielded position and a second yielded position, and stop means to limit the movement of the yieldable element at the first defined non-yielded position.

17. In a roll type coating machine including upper and lower cooperative main rolls, journals for the ends of both such main rolls, an upper bracket plate vertically movable at each end of the upper main roll, the journals for the upper main roll being mounted on the corresponding upper bracket plates, a lower bracket plate at each end of the lower main roll, the journals for the lower main roll being mounted on the corresponding lower bracket plates, a primary driving element including a sprocket wheel and, a stationary journal therefor, located at one side of the common plane which includes the main roll journals for both main rolls, the combination with said parts of means to drive both of the main rolls from such sprocket wheel comprising a sprocket wheel in driving connection with each of the main rolls, a first idler sprocket wheel journalled to a stationary part at a higher elevation than the upper bracket plate at the driving element sprocket wheel end of the machine and above the driving element sprocket wheel, a second idler sprocket wheel journalled to the upper bracket plate at a location between the first idler sprocket wheel and the upper main roll sprocket wheel, a third idler sprocket wheel journalled to the lower bracket plate at the side of the common plane aforesaid opposite to the first mentioned side of said common plane, and a continuous run of chain meshing with all of such sprocket wheels and including a tangent of run from the driving sprocket wheel to the first defined idler sprocket wheel, a tangent run from such first defined idler sprocket wheel down to the second defined idler sprocket wheel, a tangent run from such second defined idler wheel up and over the upper main roll sprocket wheel, a tangent run from such upper main roll sprocket wheel down to the third defined idler sprocket wheel, a tangent run from such third defined idler sprocket wheel up and over the sprocket wheel of the lower main roll, and a tangent run from such lower main roll sprocket wheel down to the original drive sprocket wheel, together with means to adjust the upper bracket plates at each end of the machine in vertical direction.

18. Means as defined in claim 17, wherein the idler sprocket wheel which is journaled at a higher elevation than the upper bracket plate is vertically adjustable for adjustment of chain tension.

19. Means as defined in claim 17, wherein each of the bracket plates is vertically adjustable.

References Cited in the file of this patent

UNITED STATES PATENTS

| | | |
|---|---|---|
| Re. 20,658 | Knight | Feb. 22, 1938 |
| 755,952 | Smith | Mar. 29, 1904 |
| 1,807,210 | Minnekens | May 26, 1931 |
| 2,092,051 | Cook | Sept. 7, 1937 |
| 2,326,429 | Black et al. | Aug. 10, 1943 |
| 2,359,904 | Fluckinger | Oct. 10, 1944 |
| 2,476,377 | Leclair | July 19, 1949 |